(12) United States Patent
Weddle

(10) Patent No.: US 10,960,857 B1
(45) Date of Patent: Mar. 30, 2021

(54) DEPLOYABLE CHOCK FOR A TRAILER

(71) Applicant: Badeana Weddle, Lebanon, MO (US)

(72) Inventor: Badeana Weddle, Lebanon, MO (US)

( * ) Notice: Subject to any disclaimer, the term of this patent is extended or adjusted under 35 U.S.C. 154(b) by 67 days.

(21) Appl. No.: 16/570,319

(22) Filed: Sep. 13, 2019

Related U.S. Application Data

(60) Provisional application No. 62/731,390, filed on Sep. 14, 2018.

(51) Int. Cl.
*B60T 3/00* (2006.01)

(52) U.S. Cl.
CPC ..................... *B60T 3/00* (2013.01)

(58) Field of Classification Search
CPC .............. B60T 1/14; B60T 3/00; B60T 7/12
USPC ...................... 188/4 R, 32; 410/30
See application file for complete search history.

(56) References Cited

U.S. PATENT DOCUMENTS

| 1,401,350 | A | | 12/1921 | Monahan |
| 1,653,420 | A | | 12/1927 | Van Koolbergen |
| 2,036,910 | A | | 4/1936 | Balensiefer |
| 3,625,313 | A | * | 12/1971 | Lowrie ..................... B60T 3/00 |
| | | | | 188/4 R |
| D254,595 | S | | 4/1980 | Hart |
| 5,435,418 | A | | 7/1995 | Warren et al. |
| 5,439,076 | A | * | 8/1995 | Percy, Jr. .................. B60T 1/14 |
| | | | | 188/4 R |
| D365,078 | S | | 12/1995 | Ziaylek |
| 5,901,816 | A | | 5/1999 | Camilleri |
| 5,944,145 | A | * | 8/1999 | Knight ..................... B60T 3/00 |
| | | | | 188/32 |
| 6,378,956 | B1 | | 4/2002 | Van De Walker |
| 6,957,722 | B1 | | 10/2005 | Baskerville, Sr. |
| 9,688,253 | B1 | | 6/2017 | Colby |
| 2012/0118680 | A1 | | 5/2012 | Giglio |

* cited by examiner

*Primary Examiner* — Christopher P Schwartz
(74) *Attorney, Agent, or Firm* — Cramer Patent & Design, PLLC; Aaron R. Cramer

(57) ABSTRACT

A deployable chock for a trailer includes a chock hingedly secured to an underside portion of a trailer. The chock is capable of deployment to abut a front or a rear of a wheel of the trailer to prevent a tractor trailer from moving and capable of stowing out of the way when not in use.

19 Claims, 6 Drawing Sheets

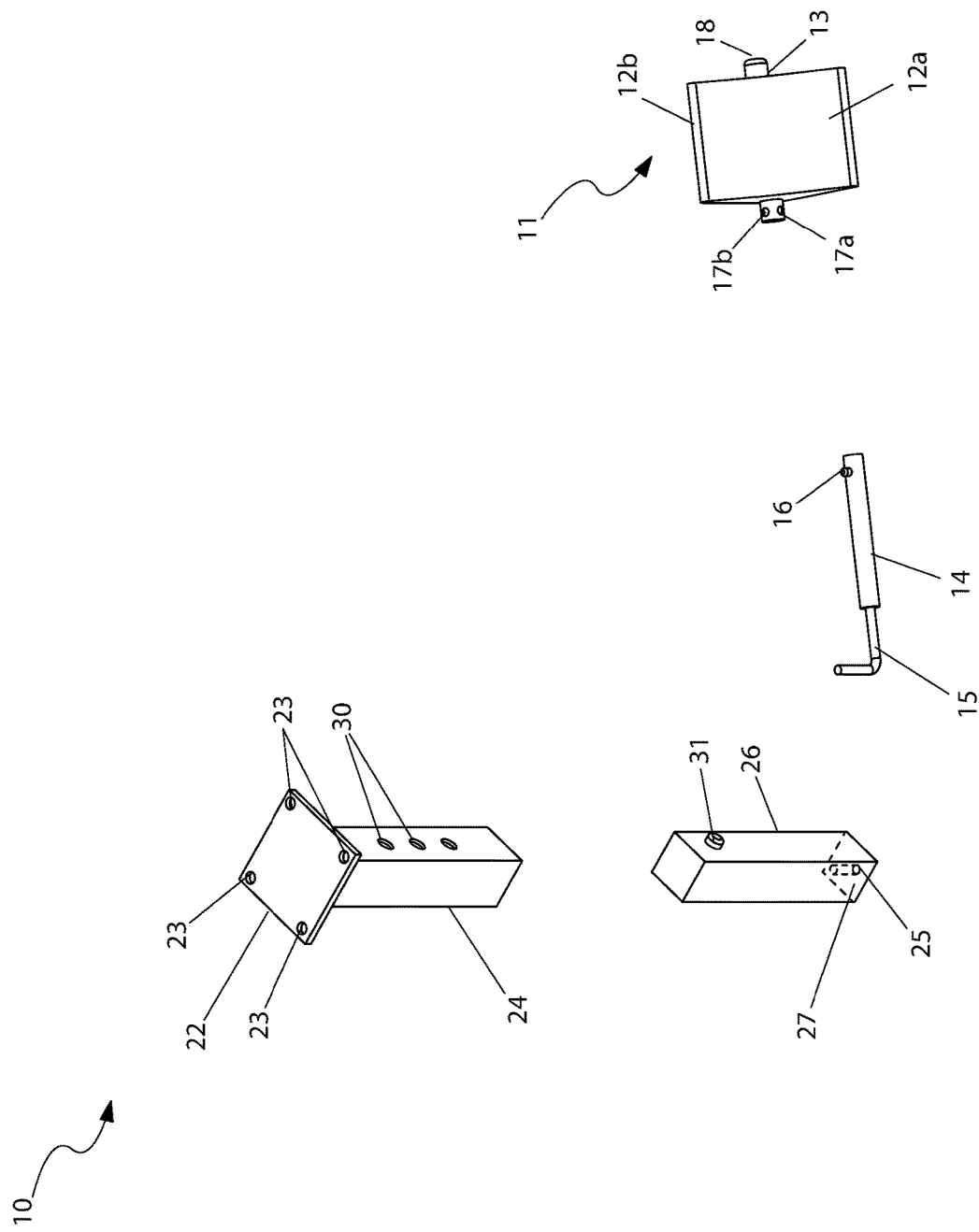

DEPLOYABLE CHOCK FOR A TRAILER

RELATED APPLICATIONS

This application is a continuation of and claims the benefit of Provisional Application 62/731,390 filed on Sep. 14, 2018.

FIELD OF THE INVENTION

The present invention relates to a deployable wheel chock mounted to a frame of a trailer.

BACKGROUND OF THE INVENTION

Wheel chocks are wedges that slide beneath the wheels of various stationery vehicles to keep them from shifting or rolling away. They can be used on trailers, cars, trucks, recreational vehicles, mobile homes, and even motorcycles. They are perfect for use on these vehicles when loading, unloading, performing routine maintenance, and parking and in fact are required by law in many instances due to the tremendous safety they afford.

However, wheel chocks suffer from the problem that they are somewhat difficult to place in that the user must often crawl upon the ground. Storing the chocks are also somewhat difficult in that they are bulky, especially when in use for trailers where there is a limited space to store them. Accordingly, there exists a need for a means by which the safety and reliability of wheel chocks can be easily enjoyed without the problems of placement and removal, such as mounting directly to the frame adjacent a wheel. The use of the deployable wheel chock provides a means of selectively placing wheel chocks against a trailer tire in a manner which is not only quick, easy and effective, but safe and secure as well.

SUMMARY OF THE INVENTION

The inventor has recognized the aforementioned inherent problems and lack in the art and observed that there is a need for a deployable chock assembly, comprises a chock having a mounting plate, an upper member, a lower member adjustably connected to the upper member, and a wedge pivotally connected to the lower member. The mounting plate has a plurality of mounting apertures and a fastener capable of fastening the mounting plate to a trailer frame element. The chock is placed against a fore side of a tire.

The deployable chock assembly also comprises an upper member which has an upper end and a lower end. The mounting plate is affixed to an entire upper perimeter of the upper end of the upper member. The upper member includes a plurality of equidistantly-spaced upper member apertures disposed along one of the sidewall faces of the upper member.

The deployable chock assembly also comprises a lower member adjustably attached to the upper member. The lower member has an upper end that slidably engages the lower end of the upper member, and a base at the lower end the upper member. The lower member has generally the same shape as the upper member but with a smaller width to enable closer sliding movement relative to the upper member.

The deployable chock assembly also comprises an extension adjustably attached to the lower member. The chock is adjustably attached to the extension. The extension having a pivot feature located on a first side thereof. The first leg is shorter than a second leg and the first leg engages the pivot aperture of the base and is capable of a pivoting movement with respect to the base of the lower member and the end of the pivot feature second leg slidably engages the first side of the extension.

The deployable chock assembly also comprises a connector passing through the chock located at the general center of gravity thereof. The connector has a first end and a second end which is located adjacent the first end of the connector is a pair of connector apertures each located ninety degrees from each other and on the same bisecting centerline with respect to the diameter of the connector. A first connector aperture is securing an extension pin of the extension such that the curved face of the chock is positioned in a first position to provide capability of being abutted against the outer perimeter of the tire, which is accomplished when the pivot feature of the extension positions the chock at the first position. A second connector aperture securing the extension pin of the extension such that the curved face of the chock is positioned in a second position to provide capability of being abutted against the outer perimeter of the tire, which is accomplished when the pivot feature of the extension positions the chock at the second position. The first position and the second position correspond to the desired placement of the chock against the tire.

The chock may be placed against an aft side of the tire. More than one of the deployable chock assemblies may be mounted adjacent thereto and chock each side of the tire. The chock may be made of lightweight material such as aluminum or a resilient or waterproof material.

The chock may be permanently mounted to the trailer frame element or the chock may be semi-permanently mounted to the trailer frame element. The fastener may comprise a plurality of U-bolts enabling the mounting plate being mounted to the trailer frame element that is not linear. The fastener may be the U-bolts which enables the mounting plate being mounted to the trailer frame element that has a sloping angle. The chock may have a generally curved face on one side and a pair of planar faces on the opposite side, having generally identical lengths on the sides.

The upper member may be a square hollow tubular element. The mounting plate may be a planar flange having a width greater than a width of the upper member. One of the sidewall faces of the lower member is a spring-loaded lower member pin engaging one of the upper member apertures of the upper member to secure a desired position of the lower member to the upper member.

The deployable chock assembly may further comprise a pivot aperture which is centrally-located on the base. The pivot feature may be generally an "L"-shaped cylindrical rod. The extension may generally be a linear cylindrical tubular member. The deployable chock assembly may be mounted to the trailer frame element of a trailer adjacent to the tire that is chocked, such that a cross-member of the trailer is located closest to the tire.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 3 is an exploded perspective view of the deployable chock assembly 10, according to the preferred embodiment of the present invention;

Figure 1:
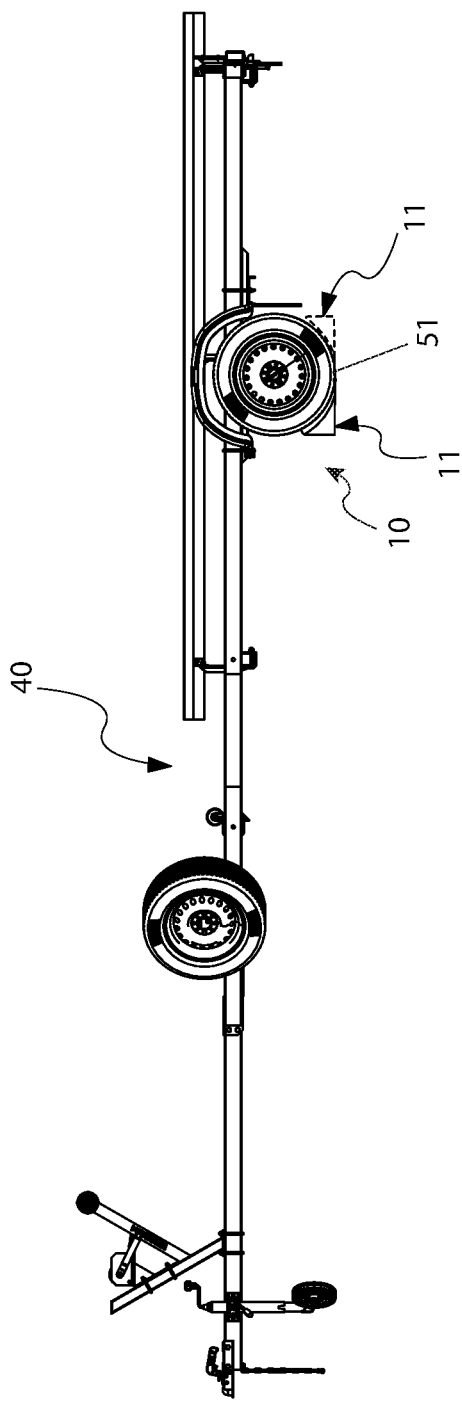
FIG. 1 is an environmental side elevation view of the deployable chock assembly 10 mounted to a frame element 50 of a trailer 40, according to the preferred embodiment of the present invention.

DESCRIPTIVE KEY 10 deployable chock assembly
11 chock
12a planar face
12b curved face
13 connector
14 extension
15 pivot feature
16 extension pin
17a first connector aperture
17b second connector aperture
18 end cap
22 mounting plate
23 mounting plate aperture
24 upper member
25 pivot aperture
26 lower member
27 base
28 pivot feature first leg
29 pivot feature second leg
30 upper member aperture
31 lower member pin
40 trailer
45 fastener
50 trailer frame element
51 wheel

DESCRIPTION OF THE INVENTION

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items. The invention particularly relates to a selectively positionable deployable chock assembly (herein described as the "assembly") 10 being mounted to a trailer frame member 50 of a trailer 40 adjacent to a wheel 51 that is to be chocked. Such a wheel 51 may also be outfitted with a tire; therefore, the chock 11 is capable of abutting the outer perimeter of wheel 51 (or tire is so present). Such a trailer 40 to be used with the present invention can be a boat trailer, although other types of trailers 40 are envisioned to be used and therefore fall under the overall scope of the invention.

FIG. 1 illustrates a side elevation view of the trailer 40, where the assembly 10 is installed thereon. It is seen that the chock 11 of the assembly 10 is placed against the fore side of the tire 51. Depicted in dashed lines, it is intended to illustrate that the chock 11 of the assembly 10 is capable of selectively being placed on the aft side of the wheel 51. The selective placement of the chock 11 of the assembly 10 is due to the needs and environmental conditions of the operator, such as a put-in location, inclined location, or other such positions.

Figure 2:
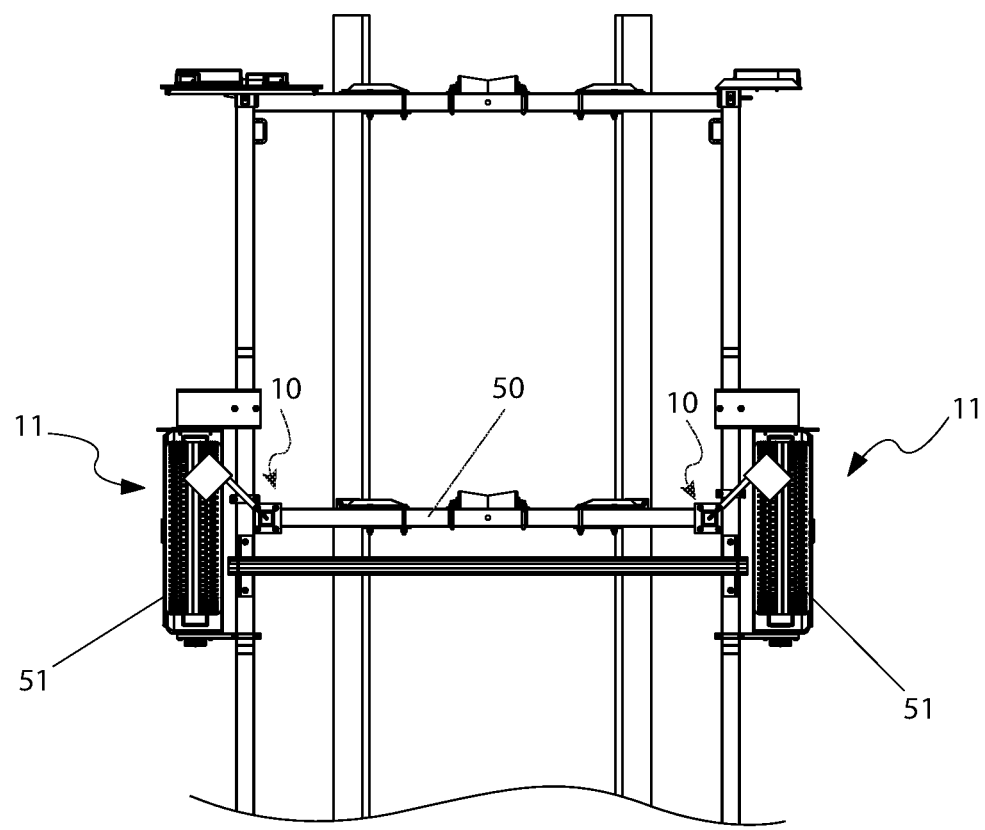
FIG. 2 is a partial environmental top plan view of a pair of deployable chock assemblies 10 mounted to a frame element 50 of a trailer 40, according to the preferred embodiment of the present invention.

FIG. 2 illustrates a bottom plan view of the trailer 40, which is to depict a preferred method of use. Such a preferred method of use is to mount an assembly 10 to the trailer frame element 50 adjacent a tire 51, such as the cross-member of the trailer 40 located closest to the tire 51. It can be seen that multiple assemblies 10 can be mounted to the trailer frame element 50 such that each tire 51 has an assembly 10 mounted adjacent thereto and capable of chocking each side (i.e., fore and aft side) of the tire 51.

Figure 4A:
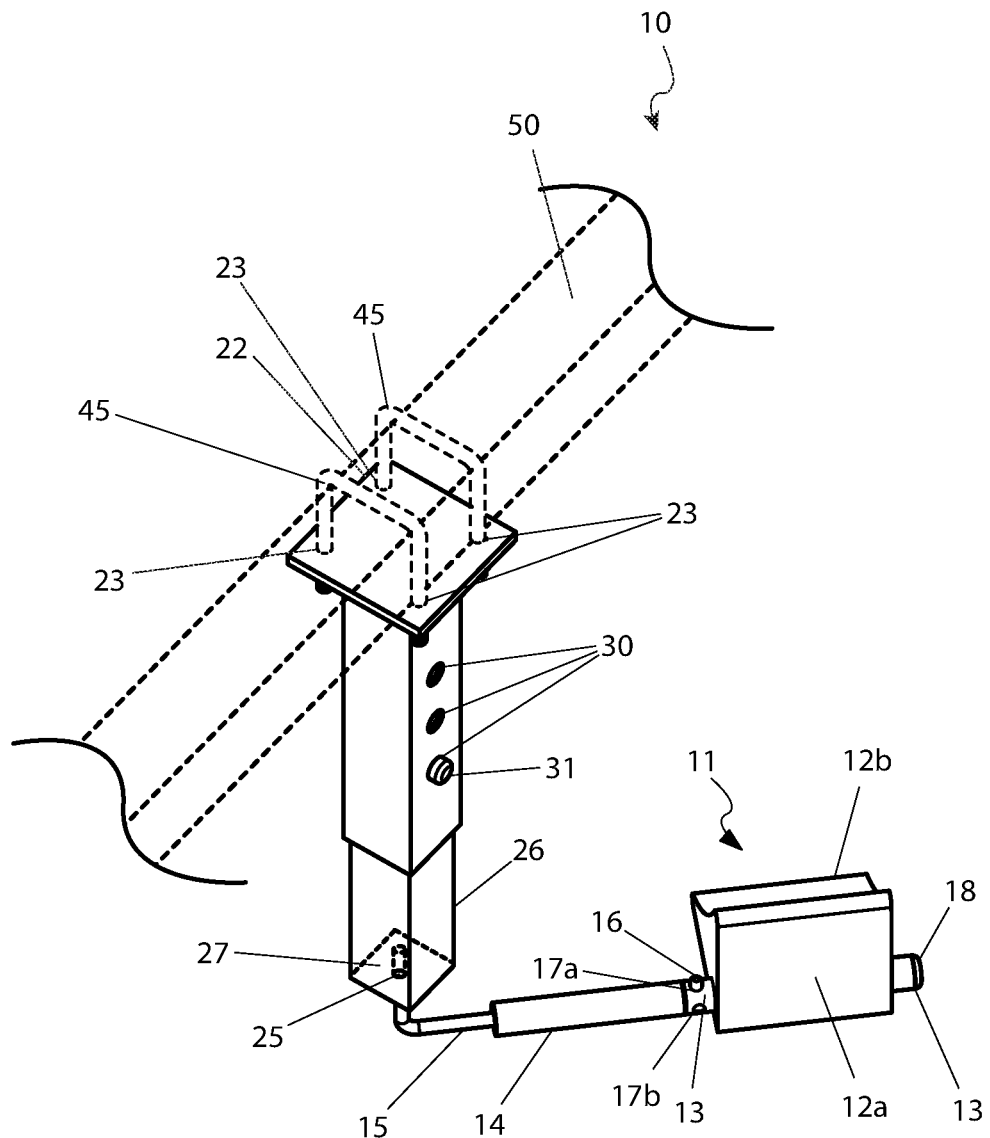
FIG. 4a is a perspective view of the deployable chock assembly 10 with the chock 11 in a first position, according to the preferred embodiment of the present invention.
Figure 4B:
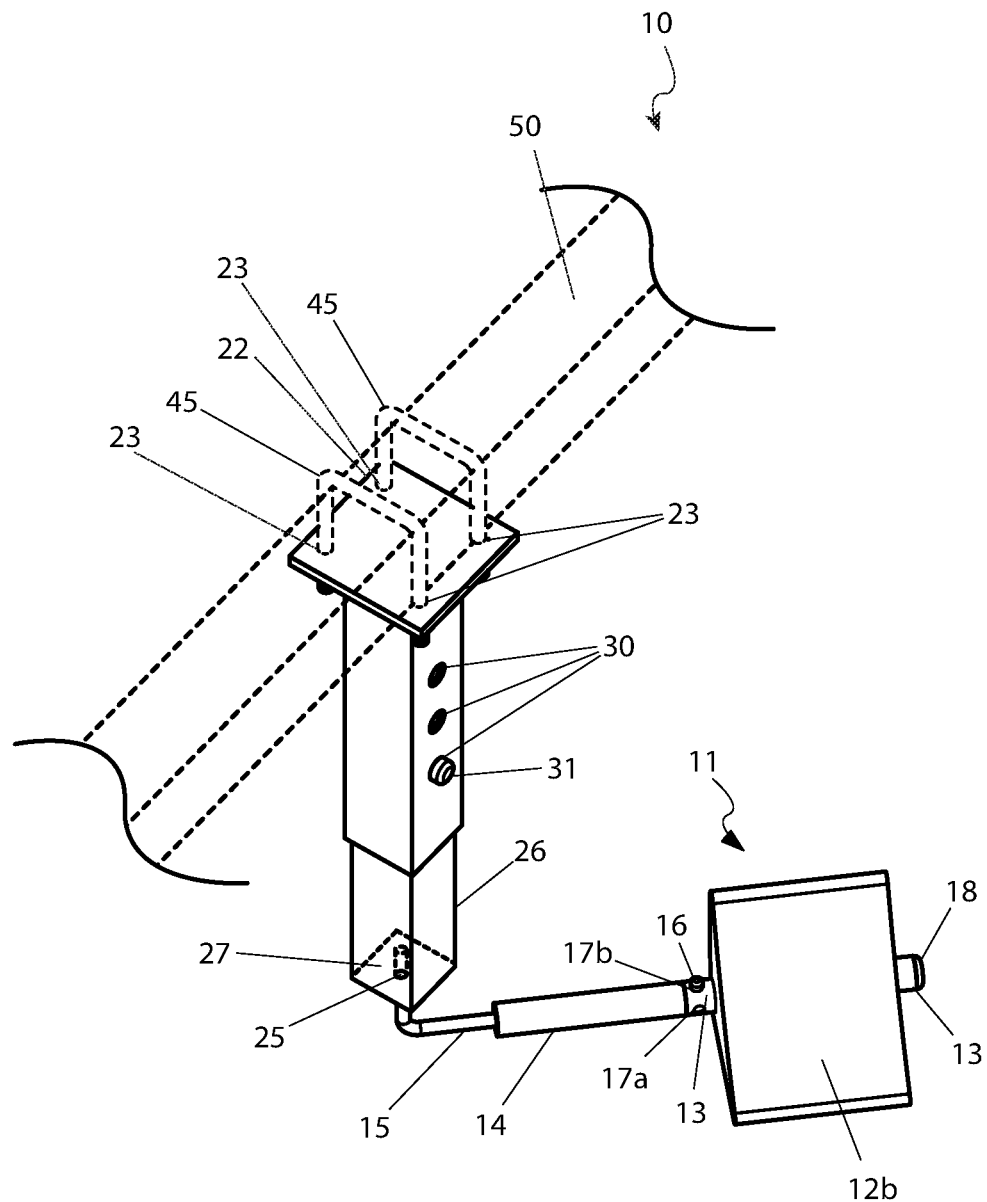
FIG. 4b is a perspective view of the deployable chock assembly 10 with the chock 11 in a second position, according to the preferred embodiment of the present invention; and, FIG. 5 is a perspective view of the chock 11, according to the preferred embodiment of the present invention.

Referring more closely now to FIGS. 4a and 4b, it can be seen that the assembly 10 can be selectively manipulated into the two (2) positions that correspond with the desired position (e.g. fore or aft side) of the tire 51. The deployable chock 10 is preferably fabricated out of aluminum or other light-weight material and is capable of being permanently or semi-permanently mounted to the trailer frame element 50 if so desired. Therefore, a resilient and weatherproof material is preferred. The deployable chock 10 generally comprises a mounting plate 22, an upper member 24, a lower member 26 adjustably connected to the upper member 24, and a wedge 12 pivotally connected to the lower member 26.

Referring now to FIG. 3, the assembly 10 includes an upper member 24, a lower member 26 adjustably attached to the upper member 24, an extension 14 adjustably attached to the lower member 26, and a chock 11 adjustably attached to the extension 14. The upper member 24 is preferably a square hollow tubular element having an upper end and a lower end. Along one (1) of the sidewall faces is a plurality of equidistantly-spaced upper member apertures 30. Affixed to an entire upper perimeter of the upper end of the upper member 24 is the mounting plate 22, which is essentially a planar flange having a width greater than the width of the upper member 24. The mounting plate has a plurality of mounting apertures 23. It is envisioned that a fastener 45 is capable of fastening the mounting plate 22 to the trailer frame element 50. Such fasteners 45 can be U-bolts, which provide the benefit of enabling the mounting plate 22 to be mounted to a trailer frame element 50 that is not linear or has a sloping angle.

The lower member 26 has generally the same shape as the upper member 24, but with a smaller width to enable closer sliding movement relative to the upper member 24. The lower member 26 has an upper end that slidably engages the lower end of the upper member 24, and a base 27 at the lower end. The lower member 26 can be hollow or solid. Along one (1) of the sidewall faces is a spring-loaded lower member pin 31 capable of engaging one (1) of the upper member apertures 30 of the upper member 24 to secure a desired position of the lower member 26 to the upper member 24. Centrally-located on the base 27 is a pivot aperture 25.

The extension 14 has a pivot feature 15 located on a first side thereof. The pivot feature 15 is generally an "L"-shaped cylindrical rod, wherein a first leg 28 is much shorter than a second leg 29. The first leg 28 engages the pivot aperture 25 of the base 27 and is capable of a pivoting movement with respect to the base 27 of the lower member 26. The end of the pivot feature second leg 29 slidably engages the first side of the extension 14. The extension 14 is generally a linear cylindrical tubular member. The second side of the extension 14 has a spring-loaded extension pin 16 extending away therefrom, capable of engaging the chock 11 for adjustable attachment thereto.

Figure 5:
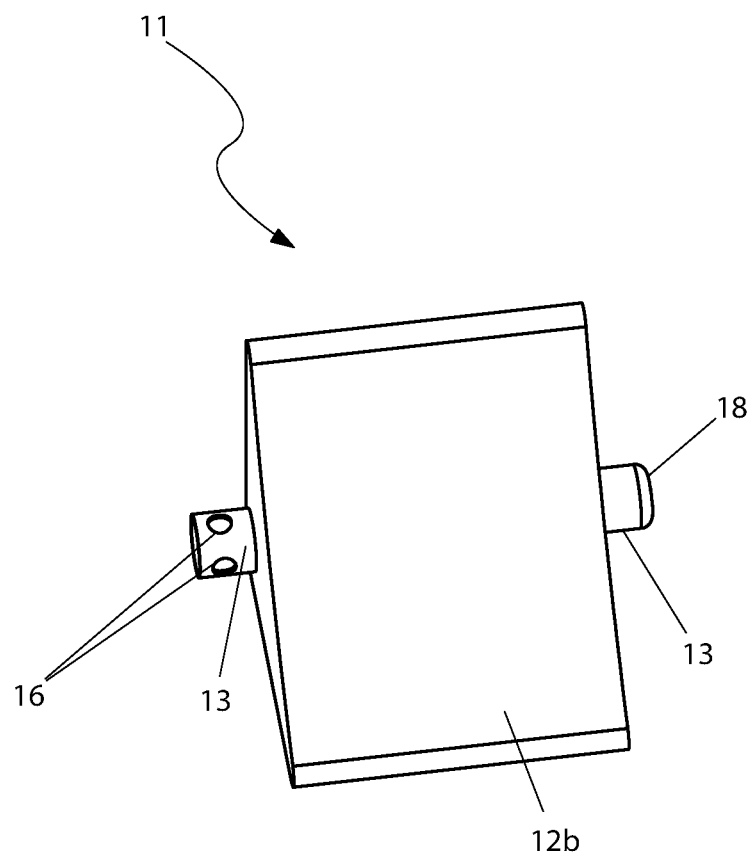

Referring now more closely to FIG. 5, the chock 11 has a generally curved face 12b on one (1) side and a pair of planar faces 12a on the opposite side, having generally identical lengths. The chock 11 therefore has a generally "L"-shaped cross-section, where one (1) of the faces 12b is curvilinear. Passing through the chock 11, and located at the general center of gravity thereof, is a connector 13. The connector 13 has a first end and a second end. Located adjacent the first end is a pair of connector apertures 17a, 17b, each located ninety degrees (90°) from each other and on the same bisecting centerline with respect to the diameter of the connector 13. A first connector aperture 17a is capable of securing the extension pin 16 of the extension 14 such that the curved face 12b of the chock 11 is positioned in a first position to provide capability of being abutted against the outer perimeter of the wheel 51. This is accomplished when the pivot feature 15 of the extension 14 positions the chock 11 at the said first position. Similarly, a second connector aperture 17b is capable of securing the extension pin 16 of the extension 14 such that the curved face 12b of the chock 11 is positioned in a second position to provide capability of being abutted against the outer perimeter of the wheel 51. This is accomplished when the pivot feature 15 of the extension 14 positions the chock 11 at the said second position. The first position and second position correspond to the desired placement of the chock 11 against the wheel 51 (i.e., the fore of aft side of the wheel 51).

The assembly 10 utilizes multiple modes of adjustability. The lower member 26 is vertically adjustable to the upper member 24 when the upper member 24 is mounted to the trailer frame element 50. The pivoting feature 15 pivots the extension 14, connector 13, and chock 11 to the desired first or second position (e.g., fore or aft) of the wheel 51 to be chocked. The connector 13 and chock 11 are rotated relative to the extension 14 depending on the aforementioned desired first or second position of chocking the wheel 51. If needed, the extension 14, connector 13, and chock 11 are slidably adjusted horizontally to position the curved face 12b of the chock 11 to chock the wheel 51.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A deployable chock assembly, comprising:
   a chock having a mounting plate, an upper member, a lower member adjustably connected to the upper member, and a wedge pivotally connected to the lower member, the mounting plate having a plurality of mounting apertures and a fastener capable of fastening the mounting plate to a trailer frame element, the chock is placed against a fore side of a tire;
   said upper member having an upper end and a lower end, the mounting plate is affixed to an entire upper perimeter of the upper end of the upper member, the upper member includes a plurality of equidistantly-spaced upper member apertures disposed along one of the sidewall faces of the upper member;
   said lower member adjustably attached to the upper member, the lower member having an upper end that slidably engages the lower end of the upper member, and a base at the lower end the upper member, the lower member has generally the same shape as the upper member but with a smaller width to enable closer sliding movement relative to the upper member;
   an extension adjustably attached to the lower member, the chock is adjustably attached to the extension, the extension having a pivot feature located on a first side thereof, a first leg is shorter than a second leg and the first leg engages the pivot aperture of the base and is capable of a pivoting movement with respect to the base of the lower member and the end of the pivot feature second leg slidably engages the first side of the extension; and
   a connector passing through the chock located at the general center of gravity thereof, the connector has a first end and a second end, located adjacent the first end of the connector is a pair of connector apertures each located ninety degrees from each other and on the same bisecting centerline with respect to the diameter of the connector, a first connector aperture is securing an extension pin of the extension such that a curved face of the chock is positioned in a first position to provide capability of being abutted against the outer perimeter of the tire, which is accomplished when a pivot feature of the extension positions the chock at the first position, a second connector aperture securing the extension pin of the extension such that the curved face of the chock is positioned in a second position to provide capability of being abutted against the outer perimeter of the tire, which is accomplished when the pivot feature of the extension positions the chock at the second position, the first position and the second position correspond to the desired placement of the chock against the tire.

2. The deployable chock assembly according to claim 1, wherein the chock is placed against an aft side of the tire.

3. The deployable chock assembly according to claim 1, wherein more than one of the deployable chock assemblies are mounted adjacent thereto and chock each side of the tire.

4. The deployable chock assembly according to claim 1, wherein the chock is made of lightweight material.

5. The deployable chock assembly according to claim 4, wherein the chock is made of aluminum.

6. The deployable chock assembly according to claim 1, wherein the chock is made of resilient material.

7. The deployable chock assembly according to claim 1, wherein the chock is made of waterproof material.

8. The deployable chock assembly according to claim 1, wherein the chock is permanently mounted to the trailer frame element.

9. The deployable chock assembly according to claim 1, wherein the chock is semi-permanently mounted to the trailer frame element.

10. The deployable chock assembly according to claim 1, wherein the fastener is a plurality of U-bolts enabling the mounting plate being mounted to the trailer frame element that is not linear.

11. The deployable chock assembly according to claim 10, wherein the fastener is the U-bolts enabling the mounting plate being mounted to the trailer frame element that has a sloping angle.

12. The deployable chock assembly according to claim 1, wherein the chock having a generally curved face on one side and a pair of planar faces on the opposite side, having generally identical lengths on the sides.

13. The deployable chock assembly according to claim 1, wherein the upper member is a square hollow tubular element.

14. The deployable chock assembly according to claim 1, wherein the mounting plate is a planar flange having a width greater than a width of the upper member.

15. The deployable chock assembly according to claim 1, wherein one of the sidewall faces of the lower member is a spring-loaded lower member pin engaging one of the upper member apertures of the upper member to secure a desired position of the lower member to the upper member.

16. The deployable chock assembly according to claim 1, further comprising a pivot aperture centrally-located on the base.

17. The deployable chock assembly according to claim 1, wherein the pivot feature is generally an "L"-shaped cylindrical rod.

18. The deployable chock assembly according to claim 1, wherein the extension is generally a linear cylindrical tubular member.

19. The deployable chock assembly according to claim 1, wherein the deployable chock assembly is mounted to the trailer frame element of a trailer adjacent to the tire that is chocked, such that a cross-member of the trailer is located closest to the tire.

* * * * *